(12) United States Patent
Persson et al.

(10) Patent No.: US 6,673,208 B2
(45) Date of Patent: Jan. 6, 2004

(54) POLYSILICATE MICROGELS AND SILICA-BASED MATERIALS

(75) Inventors: Michael Persson, Göteborg (SE); Marek Tadeusz Tokarz, Kungälv (SE); Rein Sikkar, Floda (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/186,450

(22) Filed: Jul. 1, 2002

(65) Prior Publication Data

US 2002/0179267 A1 Dec. 5, 2002

Related U.S. Application Data

(62) Division of application No. 09/455,873, filed on Dec. 7, 1999, now abandoned, which is a continuation of application No. PCT/SE98/01102, filed on Jun. 8, 1998.
(60) Provisional application No. 60/049,105, filed on Jun. 9, 1997.

(51) Int. Cl.$^7$ ................. D21H 17/74; D21H 21/10; D21H 17/28; D21H 17/45
(52) U.S. Cl. ............ 162/181.6; 162/158; 162/181.2; 162/164.1; 162/175; 162/168.3
(58) Field of Search .................. 162/158, 168.3, 162/175, 164.1, 181.1, 181.2, 181.3–181.4, 181.6–181.7, 183

(56) References Cited

U.S. PATENT DOCUMENTS

| | | | |
|---|---|---|---|
| 4,388,150 A | 6/1983 | Sunden et al. | 162/175 |
| 4,927,498 A | 5/1990 | Rushmere | 162/168.3 |
| 4,954,220 A | 9/1990 | Rushmere | 162/168.3 |
| 4,961,825 A | 10/1990 | Andersson et al. | 162/175 |
| 4,980,025 A | 12/1990 | Andersson et al. | 162/168.3 |
| 5,116,418 A | 5/1992 | Kaliski | 106/419 |
| 5,127,994 A | 7/1992 | Johansson | 162/168.3 |
| 5,176,891 A | 1/1993 | Rushmere | 423/328.1 |
| 5,185,206 A * | 2/1993 | Rushmere | 428/403 |
| 5,240,561 A * | 8/1993 | Kaliski | 162/138 |
| 5,279,663 A | 1/1994 | Kaliski | 106/486 |
| 5,279,807 A | 1/1994 | Moffett et al. | 423/338 |
| 5,312,595 A | 5/1994 | Moffett et al. | 422/129 |
| 5,368,833 A | 11/1994 | Johansson et al. | 423/338 |
| 5,378,399 A | 1/1995 | Kaliski | 252/313.1 |
| 5,447,604 A | 9/1995 | Johansson et al. | 162/181.6 |
| 5,470,435 A | 11/1995 | Rushmere et al. | 162/181.6 |
| 5,482,693 A | 1/1996 | Rushmere et al. | 423/328.1 |
| 5,503,820 A | 4/1996 | Moffett et al. | 423/333 |
| 5,543,014 A | 8/1996 | Rushmere et al. | 162/181.6 |
| 5,571,494 A | 11/1996 | Saastamoinen | 423/338 |
| 5,603,805 A | 2/1997 | Andersson et al. | 162/168.3 |
| 5,626,721 A | 5/1997 | Rushmere et al. | 162/181.6 |
| 5,676,796 A * | 10/1997 | Cutts | 162/158 |
| 5,707,494 A * | 1/1998 | Rushmere et al. | 162/181.6 |
| 5,846,384 A | 12/1998 | Schold et al. | 162/175 |
| 5,876,563 A * | 3/1999 | Greenwood | 162/175 |

FOREIGN PATENT DOCUMENTS

| | | | |
|---|---|---|---|
| EP | 359 552 A2 | 3/1990 | D21H/21/10 |
| EP | 359 552 A3 | 3/1990 | D21H/21/10 |
| JP | 62-83311 | 4/1987 | C01B/33/14 |
| WO | WO 89/06637 | 7/1989 | C01B/33/26 |
| WO | WO 91/07350 | 5/1991 | C01B/33/146 |
| WO | WO 91/07351 | 5/1991 | C01B/33/146 |
| WO | WO 94/05596 | 3/1994 | C01B/33/143 |

OTHER PUBLICATIONS

English language translation of Japanese Laid–open No. 1987–83311; laid open date Apr. 16, 1987.
Derwent abstract 107:25574 abstracting JP 62 083311.
Patent Abstracts of Japan abstracting JP 60 25119.
Moffett, Robert H., "On–site production of a silica–based microparticulate retention and drainage aid," Microgels, vol. 77, No. 12 Tappi Journal, pp. 133–138 (1994).
Hawley's Condensed Chemical Dictionary, Eleventh Edition, (Van Nostrand Reinhold Co., NY, NY copyright 1987) p. 1079 (Oct. 1989).
Sears, Jr., George W., "Determination of Specific Surface Area of Colloidal Silica by Titration with Sodium Hydroxide," Analytical Chemistry, vol. 28, No. 12, pp. 1981–1983 (1956).

\* cited by examiner

*Primary Examiner*—Jose A Fortuna
(74) *Attorney, Agent, or Firm*—Lainie E. Parker; Michelle J. Burke

(57) ABSTRACT

The present invention relates to polysilicate microgels, their preparation and use in paper making and water purification, the polysilicate microgels being obtainable by a process which comprises bringing into contact (i) particles of a salt AB with an aqueous silicate or polysilicate solution, (ii) an ion A with an ion B in the presence of an aqueous silicate or polysilicate solution, whereby the salt AB is precipitating in the aqueous phase, or (iii) an ion A with an ion B in the presence of an aqueous silicate or polysilicate solution, whereby the ions A and B represent ions of a precipitable salt AB having a $pK_s$ value of at least 4, measured at 20° C. in water. The invention further relates to aqueous silicate or polysilicate solutions, their preparation and use as precursors for polysilicate microgels. The aqueous silicate or polysilicate solutions contain an ion A which is calcium or magnesium, wherein the molar ratio of $SiO_2$:A is less than 2000:1 and higher than 1:1, or an ion B which is carbonate, sulfate or phosphate, wherein the molar ratio of $SiO_2$:B is less than 2000:1 and higher than 1:1.

23 Claims, No Drawings

POLYSILICATE MICROGELS AND SILICA-BASED MATERIALS

This application is a divisional of application Ser. No. 09/455,873, filed Dec. 7, 1999, now abandoned, which is a continuation of International Patent Application No. PCT/SE98/01102, filed Jun. 8, 1998, which claims priority to Sweden Patent Application No. 9702207-3, filed on Jun. 9, 1997, European Patent Application No. 97850092.4, filed on Jun. 9, 1997, European Patent Application No. 97850101.3, filed on Jun. 19, 1997, European Patent Application No. 97850109.6, filed on Jul. 4, 1997 and U.S. Provisional Patent Application No. 60/049,105, filed on Jun. 9, 1997.

FIELD OF THE INVENTION

The present invention generally relates to silicate- and silica-based materials. More particularly, the invention relates to polysilicate microgels, their preparation and use in paper making and water purification. The invention further relates to silica-based materials, their preparation and use as precursors for polysilicate microgels.

BACKGROUND OF THE INVENTION

Polysilicate microgels, optionally aluminated, are known in the art as drainage and retention aids in the manufacture of paper and similar cellulosic products. The microgels comprise solutions or dispersions of very small primary silica-based particles, usually with a size of from 1 to 2 nm in diameter and having a high specific surface area, typically at least about 1000 $m^2/g$, which are linked together into individual chains to form three-dimensional network structures.

The preparation of polysilicate and aluminated polysilicate microgels generally comprises acidifying a dilute aqueous solution of alkali metal silicate by using an acid or acid ion-exchanger, ageing the acidified mixture and then further diluting the aged mixture to a silica concentration of not greater than 2% by weight. The silica-based microgels normally have poor stability and the high dilution is normally necessary to avoid gelation of the microgels. Because of the stability problems associated with these products, and the prohibitive cost of shipping stable, but extremely dilute, solutions containing about 0.5% by weight or less of silica, the polysilicate microgels are preferably prepared at the location of intended use, for example at the paper mill. Production units or generators for continuously preparing polysilicate microgels that are installable at the paper mill are known in the art. Hereby the microgels obtained can be prepared and continuously introduced into the stock containing cellulosic fibres and filler to be drained. However, any disturbance in the production unit, for example variations in quality and/or quantity of the microgel produced, will change the drainage and retention performance of the product which may adversely affect the paper making process, thereby producing cellulosic products of uneven quality.

SUMMARY OF THE INVENTION

The present invention generally relates to polysilicate microgels and their use in paper making and water purification. The invention also relates to a process for the preparation of aqueous polysilicate microgels which comprises bringing into contact an ion A with a protonic acid comprising an ion B in the presence of an aqueous silicate or polysilicate solution, whereby the ions A and B represent ions of a precipitable salt AB having a $pK_S$ value of at least 4, measured at 20° C. in water.

DETAILED DESCRIPTION OF THE INVENTION

In accordance with the present invention it has been found that polysilicate microgels can be prepared in a very advantageous manner by bringing into contact particles of a salt AB with an aqueous silicate or polysilicate solution, or ions of A with ions of B in the presence of an aqueous silicate or polysilicate solution, the salt AB representing a precipitable salt, whereby AB can be formed and precipitated in the aqueous phase and the contacting of the salt AB or ions A and B with the silicate or polysilicate solution favours polysilicate microgel formation. The process can be carried out by mixing the ions A and B and the silicate or polysilicate solution as three separate components; it is also possible to carry out the process by incorporating the ion A into the silicate or polysilicate solution and mixing the solution with the ion B, or by incorporating the ion B into the silicate or polysilicate solution and mixing the solution with the ion A, whereby the salt AB can be formed and precipitated in the aqueous phase and favours polysilicate microgel formation. More specifically, this invention relates to a process for preparing polysilicate microgels which comprises bringing into contact particles of a salt AB with an aqueous silicate or polysilicate solution, or an ion A with an ion B in the presence of an aqueous silicate or polysilicate solution, whereby the salt AB is precipitating in the aqueous phase, and/or the ions A and B represent ions of a precipitable salt AB having a $pK_S$ value of at least 4, measured at 20° C. in water. The invention thus relates to a process for preparing polysilicate microgels, polysilicate microgels per se and their use, as further defined in the claims.

According to the present invention there is provided a process for preparing polysilicate microgels employing high-concentration silicate and polysilicate solutions, i.e. solutions containing $SiO_2$. According to the invention there is also provided high-concentration silicate and polysilicate solutions containing an ion of a precipitable salt. The high-concentration silicate and polysilicate solutions act as precursors for polysilicate microgels. The silicate and polysilicate solutions, optionally containing an ion of a precipitable salt, i.e. polysilicate microgel precursors, of this invention exhibit high stability and can be easily prepared and shipped at considerably higher $SiO_2$ concentrations compared to previously known polysilicate microgels. The high-concentration silica-based solutions of this invention can be prepared under controlled conditions in a plant intended for such production and shipped as a concentrated product to the paper mill in an economically attractive manner. By simply mixing particles of AB or ions A and B of a precipitable salt AB with the silicate or polysilicate solution, or by adding the counter-ion of the precipitable salt, B, for example in the form of an aqueous solution, to the high-concentration product containing the ion A, or vice versa, polysilicate microgels can be formed which are ready for use, for example as drainage and retention aids in papermaking. In this application, a storage tank for the high-concentration polysilicate microgel precursor can be installed at the location of intended use, which is more attractive economically than installing a complete polysilicate microgel production unit or generator. Hereby the present invention offers substantial technical and economic benefits. In addition, the high-concentration product containing the ion A of this invention can be added to a suspension containing the desired counter-ion and cellulosic fibres, for example white water to be recirculated in the paper making process, where polysilicate microgels can be formed while recirculating the white water to the fibre suspension to be drained. This application using the high-concentration silica-based material of this invention as a precursor for in situ formation of polysilicate microgels represents a significant progress in the art.

The aqueous solution of silicate or polysilicate to be used in the process of this invention can be selected from any water-soluble silicate salt such as sodium or potassium silicate, or sodium or potassium water glass. These are available with varying molar ratios of $SiO_2$ to $Na_2O$ or $K_2O$ and the molar ratio is usually within the range of from 1.5:1 to 4.5:1, most often from about 2.5:1 to 3.9:1. The alkali metal silicate preferably is a sodium silicate. Aqueous solutions of alkali metal silicate are alkaline and usually have a pH of about 13 or above 13. The alkali metal silicate solution usually has a $SiO_2$ content of at least 1% by weight and usually the $SiO_2$ content is within the range of from 5 to 35% by weight, suitably above 10% and preferably within the range of from 15 to 30% by weight.

The aqueous solution of silicate or polysilicate to be used in the process of this invention can also be selected from any water-soluble polysilicate such as sodium or potassium polysilicate, preferably a sodium polysilicate. Water-soluble polysilicates are known in the art. The polysilicate can have a high molar ratio $SiO_2:Na_2O$, for example within the range of from 3:1 to 50:1, suitably from 4:1 to 30:1 and preferably from 4.5:1 or from 5:1 to 20:1. The polysilicate can have a molar ratio of $SiO_2:M_2O$, where M is alkali metal, e.g. Li, Na, K and mixtures thereof, within the range of from 2:1 to 50:1, suitably from 2.2:1 to 30:1 and preferably from 3:1 to 20:1. The aqueous polysilicate solution generally has a pH below 14, suitably below 13 and preferably below 12. The pH is suitably above 9.

Suitable polysilicates can be prepared by mixing an aqueous solution of alkali metal silicate, for example as described above, with an aqueous phase of silica-based material. Suitable silica-based materials can be selected from a wide variety of siliceous materials, optionally aluminated, including dispersed silicas such as, for example, silica-based sols, e.g. alkali-stabilized aqueous sols comprising colloidal particles of silica, aluminium-modified silica or aluminium silicate, fumed silica, silica gels, precipitated silicas, acidified solutions of alkali metal silicates, optionally aluminated, e.g. polysilicic acid, polymeric silicic acid, active, or activated, silica, polysilicates, optionally aluminated, like polyaluminosilicates, as well as suspensions of silica-containing clays of smectite-type. The aqueous solution of silica-based material can have a pH within the range of from 1 to 11. In one preferred aspect of this invention, the pH of the aqueous silica-based material is within the range of from 1.5 to 4. In another preferred aspect of this invention, the pH of the aqueous silica-based material is within the range of from 4 to 11.0, usually from 4.5, suitably from 6.5 and most preferably from 7 up to 11.0, preferably up to 10.6.

The resulting polysilicate solution usually has a $SiO_2$ content of at least 1% by weight and normally it is at least 5% by weight. Suitably the $SiO_2$ content is at least 10% by weight, preferably at least 15% by weight and most preferably at least 17.5% by weight. The upper limit is usually about 50% by weight, suitably about 35% by weight and in most cases about 30% by weight. If desired, after preparation, the aqueous polysilicate solution can be subjected to further treatment like ion-exchange and/or concentration. This can be advantageous so as to provide products having improved storage-stability and/or higher concentration. Concentration can be carried out by known methods, for example by membrane processes or evaporation of water.

In a preferred embodiment of this invention, the aqueous solution of silicate or polysilicate is brought into contact with particles of the salt AB. Preferably the particles are colloidal, i.e. in the colloidal range of particle size, e.g. less than 1 $\mu$m, suitably less than 500 nm and preferably within the range of from 100 nm to 1 nm. The particles of AB can be used in solid form although it is generally preferred to use an aqueous phase containing particles of AB, for example in the form of a sol or suspension. In another preferred embodiment of this invention, ions of A and B are brought into contact in the presence of the aqueous silicate or polysilicate solution. The ions A and B can be added to the mixing zone in the form of salts AC and DB, respectively. In yet another preferred embodiment of this invention, one of the ions A or B of the salt AB is present in the silicate or polysilicate solution, for example in the form of a salt AC or a salt DB. When mixing the silicate or polysilicate solution comprising, for example, the ion A with the ion B, or vice versa, there can be formed a precipitate AB. This can be conducted by adding a salt AC to the silicate or polysilicate solution and then adding DB to the solution or mixture containing AC. Suitable $SiO_2$ contents and pH values of silicate and polysilicate solutions containing the ion A, or the ion B, include those described above with regard to aqueous solutions of silicate and polysilicate.

The salt AB is preferably a salt having a $pK_S$ of at least 4, suitably at least 6 and preferably at least 8, measured at 20° C. in water. The term "AB", as used herein, is meant to include a salt and/or ion-pair of positive ion(s) A and negative ion(s) B. Suitable AB's include inorganic salts, e.g. metal salts of phosphates, carbonates and sulfates. Suitable AB's include aluminium phosphate, iron carbonate, iron hydroxide, iron phosphate, magnesium sulfate, magnesium carbonate, magnesium hydroxide, magnesium phosphate, calcium sulfate, calcium carbonate, calcium phosphate, calcium silicate, strontium sulfate, strontium carbonate, and zinc carbonate. Calcium carbonate and calcium sulfate are particularly preferred. Suitable organic salts AB include magnesium and zinc oxalates. The aqueous solution of silicate or polysilicate can also be brought into contact with particles of AB being a microparticulate organic or inorganic polymer having charged group(s) A and counter-ion(s) B, preferably an organic polymer. Preferably the polymer particles are in the colloidal range of particle size, as described above. Suitable charged groups of type A for cationic organic polymers include ammonium and sulfonium with suitable counter-ions of type B including those mentioned above and chloride, bromide and sulfate. Suitable charged groups of type A for anionic organic polymers include carboxylic and sulphonic acids with suitable counter-ions of type B including those mentioned above and protons and ammonium.

The salt AC is preferably a water-soluble salt and preferably also soluble in the silicate or polysilicate solution. The salt AC can be added as a solid substance or as an aqueous solution. The term "AC", as used herein, is meant to include a salt and/or ion-pair of positive ion(s) A and negative ion(s) C. Suitable ions A include those mentioned above and notably calcium and magnesium. Suitable ions C include chloride, nitrate, formiate and acetate. Suitable AC's include calcium chloride, calcium nitrate, calcium formiate, magnesium formiate, calcium acetate and magnesium acetate. Optionally, for example in the case where the silicate or polysilicate solution contains the salt AC, it can be treated with a complexing agent so as to avoid precipitation of a salt containing A before being brought into contact with B. Examples of suitable complexing agents that can be used when A is a metal ion such as, for example, Ca or Mg include EDTA, citric acid, glucose, saccharose, polyols, HEDP, DTPA, etc. Usually the complexing agent is used in an amount that is effective to avoid precipitation of a salt of the ion A. Suitably the molar ratio of complexing agent to A is within the range of from 5:1 to 1:5, preferably from 2:1 to 1:2. The molar ratio of $SiO_2$:A in the silicate or polysilicate solution, or in the mixing zone where the ions A and B are brought into contact in the presence of the silicate or polysilicate solution, may be varied over a broad range and is usually less than 5000:1, often less than 2000:1 and more often less than 1000:1, and often higher than 1:1; in many cases it is from 500:1, suitably from 50:1 and preferably from 25:1, to 1:1, suitably to 2:1 and preferably to 5:1.

The salt DB is preferably a water-soluble salt and preferably also soluble in the silicate or polysilicate solution. The salt DB can be added as a solid substance or as an aqueous solution, preferably a solution. The term "DB", as used herein, is meant to include a salt and/or ion-pair of positive ion(s) D and negative ion(s) B. Suitable ions D include alkali metals like sodium and potassium. Suitable ions B include those mentioned above and notably carbonates, sulfates and phosphates. Suitable DB's include sodium carbonate, sodium hydrogen carbonate, sodium sulfate, sodium hydrogen sulfate, sodium phosphate and sodium hydrogen phosphate. Suitable DB's can also be selected from protonic acids comprising hydrogen(s) D and the ion B such as, for example sulfuric acid and phosphoric acid. Acids of DB are preferably added as a dilute aqueous acid solution. The ion B can also be selected from carbonate originating from carbon dioxide which can be introduced by bringing the solution into contact with carbon dioxide in solid, liquid or gaseous form, either pure or diluted, for example through absorption from the air. The molar ratio of $SiO_2$:B in the silicate or polysilicate solution, or in the mixing zone where the ions A and B are brought into contact in the presence of the silicate or polysilicate solution, may be varied over a broad range and is usually less than 5000:1, often less than 2000:1 and more often less than 1000:1, and often higher than 1:1; in many cases it is from 500:1, suitably from 50:1 and preferably from 25:1, to 1:1, suitably to 2:1 and preferably to 5:1.

The salt DC, optionally being formed in the present process by introducing AC and DB, is preferably a water-soluble salt and preferably also soluble in the silicate or polysilicate solution. The term "DC", as used herein, is meant to include a salt and/or ion-pair of positive ion(s) D and negative ion(s) C. Suitable D's and C's include those mentioned above.

When mixing particles of AB with the silicate or polysilicate solution according to one preferred embodiment of the invention, the molar ratio of $SiO_2$:AB may be varied over a broad range and is usually less than 5000:1, often less than 2000:1 and more often less than 1000:1, and often higher than 1:1; in many cases it is from 500:1, suitably from 50:1 and preferably from 25:1, to 1:1, suitably to 2:1 and preferably to 5:1. When contacting A with B in the presence of the silicate or polysilicate solution according to a preferred embodiment of the invention, the concentrations of A and B are preferably chosen such that the product of the molar concentrations ([A] times [B]) in the resulting mixture exceeds the solubility product ($K_S$) of the mixture.

The mixing process according to the invention can take place at a temperature of from 10 to 90° C., preferably from 20 to 50° C. In the mixing process, the pH of the mixture obtained can be the same as, higher than or less than that of the silicate or polysilicate solution, suitably the same or less and preferably less than that of the silicate or polysilicate solution. A suitable pH range can be from 5 to 11. Suitable acids which can be used in the mixing process to obtain the desired pH value or range include conventional acids such as, for example, inorganic acids like $H_2SO_4$, HCl, etc, and organic acids like formic acid, acetic acid, etc.

The ions A and B, as described above, can of course be introduced into the silicate or polysilicate solution in a reverse order, i.e. first introducing the ion B, for example in the form of the salt DB, optionally in combination with a complexing agent, for example as described above, into the high-concentration silicate or polysilicate solution and then adding the ion A to the solution containing B, thereby forming AB and polysilicate microgels.

The mixing process according to the present process suitably comprises introducing particles of AB in the form of a very fine microparticulate material, or causes the salt AB to form and preferably precipitate as a very fine microparticulate material, thereby stimulating polysilicate microgel formation. Preferably the microprecipitate of AB comprises particles in the colloidal range of particle size, as described above. It is believed that at least part of the introduced and/or precipitated AB microparticles will be covered by polysilicate material, and that AB microparticles will act as nuclei for silica microparticle formation. The polysilicate microgel obtained by the process can be described as an aqueous dispersion or solution, preferably colloidal, of silica-based microparticulate material comprising very small particles, preferably 1–2 nm in diameter, which preferably are linked together in chains or networks to form three-dimensional structures. The aqueous polysilicate microgels may also contain larger particles depending on, inter alia, the starting materials used in the preparation of the microgels. Preferably the polysilicate microgel is anionic in nature. The specific surface area of the silica-based microparticles, the microgel, suitably is at least 1000 $m^2/g$ and usually up to about 1700 $m^2/g$. The specific surface area can be measured by means of titration with NaOH in known manner, e.g. as described by Sears in Analytical Chemistry 28(1956):12, 1981–1983 and in U.S. Pat. No. 5,176,891. The specific surface area represents the average specific surface area of the particles.

The aqueous polysilicate microgels obtained by the mixing process can have a $SiO_2$ content of from 0.1 to 10% by weight. In a preferred embodiment of the invention, the mixing process is carried out at the location of intended use of the polysilicate microgels, for example at the paper mill. In a preferred embodiment, the silicate or polysilicate solution, optionally containing one of the ions of the precipitable salt AB such as, for example, carbonate, sulfate or phosphate which suitably is introduced into the solution in the form of DB as described above, is mixed with white water containing calcium ions. The white water can be subjected to any purification step, for example any of those commonly used in the art to remove fibres, fillers, particulate material, colloidal and/or dissolved organic substances, such as precipitation, sedimentation, flotation and filtration, before being contacted with the silicate or polysilicate solution of this invention. The polysilicate microgels formed may then be introduced into the fibre stock to be drained. It is also possible to add the silicate or polysilicate solution directly to a aqueous solution or suspension to be drained or flocculated, provided that the salt AB can be formed in situ. The polysilicate microgels can also be formed in a pre-mix mode where an aqueous stream of silicate or polysilicate containing A is brought into contant with an aqueous stream of B, whereby the resulting stream is introduced into the aqueous solution or suspension to be drained or flocculated.

The polysilicate microgels, of this invention are suitable for use as flocculating agents, for example in the production of pulp and paper and within the field of water purification, both for purification of different kinds of waste water and for purification specifically of white water from the pulp and paper industry. The polysilicate microgels can be used as flocculating agents in combination with organic polymers which can be selected from anionic, amphoteric, nonionic and cationic polymers and mixtures thereof. The use of such polymers as flocculating agents is well known in the art. The polymers can be derived from natural or synthetic sources, and they can be linear or branched. Examples of generally suitable polymers include anionic, amphoteric and cationic starches, anionic, amphoteric and cationic guar gums, and anionic, amphoteric and cationic acrylamide-based polymers, as well as cationic poly(diallyldimethyl ammonium chloride), cationic polyethylene imines, cationic polyamines, cationic polyamidoamines, cationic vinylamide-based polymers, melamine-formaldehyde and ureaformaldehyde resins. Suitably the polysilicate microgel is used in combination with at least one cationic or amphoteric polymer, preferably cationic polymer. Cationic starch and cationic polyacrylamide are particularly preferred polymers. Even if arbitrary order of addition can be used, it is preferred that the polymer or polymers be added to pulp, stock or water before the silica-based material/polysilicate microgels.

The preferred field of use for the polysilicate microgels, in combination with polymer as described above, is for improvement of drainage and/or retention in the manufacture of paper, i.e. the use as drainage and/or retention aids in papermaking. The present invention further relates to a process for the production of paper from a suspension of cellulosic fibres, and optional fillers, which comprises introducing into the suspension at least one cationic or amphoteric organic polymer and the polysilicate microgels as described herein, forming and draining the suspension on a wire. The invention thus relates to a process as further defined in the claims.

When using the polysilicate microgels in combination with a main organic polymer as mentioned above, it is further preferred to use at least one anionic trash catcher (ATC). ATC's are known in the art as neutralizing agents for detrimental anionic substances present in the stock. Hereby ATC's can enhance the efficiency of other additives used in the process. Thus, further suitable combinations of polymers that can be co-used with the polysilicate microgels include ATC in combination with high molecular weight polymer, e.g. cationic starch and/or cationic polyacrylamide, anionic polyacrylamide as well as cationic starch and/or cationic polyacrylamide in combination with anionic polyacrylamide. Suitable ATC's include cationic polyelectrolytes, especially low molecular weight highly charged cationic organic polymers such as polyamines, polyethyleneimines, homo- and copolymers based on diallyldimethyl ammonium chloride, (meth)acrylamides and (meth)acrylates. Normally, ATC's are added to the stock prior to other polymer(s). Alternatively, the ATC polymer can be added simultaneously with the other polymer(s), either separately or in admixture. Mixtures comprising ATC polymer and high molecular weight cationic polymer are particularly preferred.

The amount of polysilicate microgel or silica-based material added to the stock, or suspension of cellulosic fibres, may vary within wide limits depending on, among other things, type of stock, type of polysilicate microgels used. The amount usually is at least 0.01 kg/ton and often at least 0.05 kg/ton, calculated as $SiO_2$ and based on dry stock system, i.e. cellulosic fibres and optional fillers. The upper limit can be 8 kg/ton and suitably is 5 kg/ton. Usually the dosage of silica-based material is within the range of from 0.1 to 2 kg/ton.

The dosage of organic polymer to the stock can be varied over a broad range depending on, among other things, the type of polymer or polymers used and whether other effects are desired, e.g. wet and dry paper strength. Usually, there is used at least 0.005 kg of polymer per ton of dry fibres and optional fillers. For synthetic cationic polymers, such as for example cationic polyacrylamide, amounts of at least 0.005 kg/ton are usually used, calculated as dry on dry fibres and optional fillers, suitably from 0.01 to 3 and preferably from 0.03 to 2 kg/ton. For cationic polymers based on carbohydrates, such as cationic starch and cationic guar gum, amounts of at least 0.05 kg/ton, calculated as dry on dry fibres and optional fillers, are usually used. For these polymers the amounts are suitably from 0.1 to 30 kg/ton and preferably from 1 to 15 kg/ton.

The polysilicate microgels of the invention are preferably used as drainage and/or retention aids in combination with at least one organic polymer, as described above, and at least one aluminium compound. Aluminium compounds can be used to further improve the drainage and/or retention performance of stock additives comprising polysilicate microgels. Suitable aluminium salts include alum, aluminates, aluminium chloride, aluminium nitrate and polyaluminium compounds, such as polyaluminium chlorides, polyaluminium sulphates, polyaluminium compounds containing both chloride and sulphate ions, polyaluminium silicate-sulphates, and mixtures thereof. The polyaluminium compounds may also contain other anions, for example anions from phosphoric acid, organic acids such as citric acid and oxalic acid. Preferred aluminium salts include sodium aluminate, alum and polyaluminium compounds. The aluminium compound can be added before, simultaneously with or after the addition of the silica-based material/polysilicate microgels. In many cases, it is often preferred to incorporate the aluminium compound early into the stock system prior to the other additives. Alternatively, or additionally, the aluminium compound can be added simultaneously with the silica-based material/polysilicate microgels, either separately or in admixture with it.

The amount of aluminium compound added to the suspension may depend on the type of aluminium compound used and whether other effects are desired. It is for instance well-known in the art to utilize aluminium compounds as precipitants for rosin-based sizes. The amount of aluminium compound added to the stock should suitably be at least 0.001 kg/ton, calculated as $Al_2O_3$ and based on dry fibres and optional fillers. Suitably the amount is within the range of from 0.01 to 5 kg/ton and preferably within the range of from 0.05 to 1 kg/ton.

The papermaking process according to the invention can be used for producing cellulosic products in sheet or web form such as for example pulp sheets and paper. It is preferred that the process is used for the production of paper. The term "paper", as used herein, of course include not only paper and the production thereof, but also other sheet or web-like products, such as for example board and paperboard, and the production thereof. The papermaking process according to the invention can be used in the production of sheet or web-like products from different types of suspensions containing cellulosic fibres and the suspension, or stock, should suitably contain at least 50% by weight of such fibres, based on dry substance. The suspension can be based on fibres from chemical pulp, such as sulphate and sulphite pulp, thermomechanical pulp, chemo-thermomechanical pulp, refiner pulp or groundwood pulp from both hardwood and softwood, and can also be used for suspensions based on recycled fibres. The suspension can also contain mineral fillers of conventional types, such as for example kaolin, titanium dioxide, gypsum, talc and both natural and synthetic calcium carbonates. The suspension can have a pH within the range from about 3 to about 10. The pH is suitably above 3.5 and preferably within the range of from 4 to 9. The stock can of course also contain papermaking additives of conventional types, such as wet-strength agents, stock sizes based on rosin, ketene dimers or alkenyl succinic anhydrides, and the like.

The invention is further illustrated in the following Examples which, however, are not intended to limit same. Parts and % relate to parts by weight and % by weight, respectively, unless otherwise stated.

EXAMPLE 1

Polysilicate microgels according to the invention were prepared as follows: 15 g of an aqueous solution of sodium water glass containing 10% of $SiO_2$ was put into a beaker and 52 g of 1% $H_2SO_4$ was added under vigorous stirring. Then 22.4 g of 0.1% aqueous solution of $CaCl_2$ was added under vigorous stirring. The obtained aqueous silica-based material had a pH of 10, a $SiO_2$ content of 1.7% by weight and a negative surface charge of about 1100 ueqv/g, measured one hour after its preparation by means of a Mütek Particle Charge Detector PCD 03 M, indicating formation of polysilicate microgels.

EXAMPLE 2

Polysilicate microgels according to the invention were prepared as follows: 120 g of an aqueous solution of sodium water glass containing 10% of $SiO_2$ was put into a beaker and 260 g of 1% $H_2SO_4$ was added under vigorous stirring and then the mixture was diluted with 155 g of water. Next, 179 g of 0.1% aqueous solution of $CaCl_2$ was added under vigorous stirring. Finally, carbon dioxide was bubbled through the mixture until pH was about 10. The obtained aqueous silica-based material had a $SiO_2$ content of 1.7% by weight and a negative surface charge of about 1000 ueqv/g, measured as above, indicating formation of polysilicate microgels.

EXAMPLE 3

For comparison, the procedure of Example 1 was followed except that no $CaCl_2$ was added. The surface charge of the product was evaluated as in Example 1, showing a negative surface charge of about 1800 ueqv/g, indicating essentially no formation of polysilicate microgels.

EXAMPLE 4

In the following tests, drainage and retention performance of the silica-based materials according to Examples 1 and 3 was evaluated in conventional manner by means of a Dynamic Drainage Analyser (DDA), available from Akribi, Sweden.

The tests were made using a furnish based on 70% cellulosic fibres based on a 60/40 mixture of bleached birch/pine sulphate and 30% of chalk. Stock consistency was 0.25%, conductivity 0.45 mS/cm and pH 8.5. In the tests, the silica-based materials were tested in conjunction with a cationic polymer, Raisamyl 142, which is a conventional medium-high cationized starch having a degree of substitution of 0.042, which was added to the stock in an amount of 12 kg/ton, calculated as dry on dry stock system.

The stock was stirred in a baffled jar of the DDA at a speed of 1000 rpm and cationic starch was added to the stock prior to adding the silica-based material and then the stock was drained.

Table I shows the results obtained when using varying dosages (kg/ton, calculated as $SiO_2$ and based on dry stock system) of silica-based material about 2 h after its preparation.

TABLE I

| Silica-based $SiO_2$ dosage of Material | Drainage time (sec)/Retention of fines (%) at | | | | |
|---|---|---|---|---|---|
| | 0.5 kg/ton | 1.0 kg/ton | 1.5 kg/ton | 2.0 kg/ton | 3.0 kg/ton |
| Example 1 | 9.8/51 | 7.2/69 | 6.5/77 | 6.2/75 | –/70 |
| Example 3 | 12.5/19 | 10.2/27 | 9.5/32 | 9.2/24 | –/25 |

We claim:

1. A process for the production of paper from a suspension of cellulosic fibers, and optional filler, which comprises adding to the suspension at least one drainage and retention aid, said drainage and retention aid comprising at least one cationic or amphoteric organic polymer and aqueous polysilicate microgels obtained by bringing into contact (i) particles of a salt AB with an acid and an aqueous silicate solution, or (ii) an ion A with a protonic acid comprising an ion B in the presence of an aqueous silicate solution, or (iii) an ion A with an ion B and an acid in the presence of an aqueous silicate solution, whereby the ions A and B represent ions of a precipitable salt AB having a pKS value of at least 4, measured at 20° C. in water, and forming and draining the suspension on a wire.

2. The process of claim 1, wherein the aqueous polysilicate microgels obtained have a specific surface area of at least 1000 m$^2$/g.

3. The process of claim 1, wherein the aqueous silicate solution has a molar ratio of SiO2 to the salt AB higher than 1:1.

4. The process of claim 1, wherein the salt AB has a pK$_S$ value of at least 8, measured at 20° C. in water.

5. The process of claim 1, wherein the salt AB is precipitating in the aqueous phase.

6. The process of claim 1, wherein the salt AB comprises particles in the colloidal range of particle size.

7. The process of claim 1, wherein the aqueous polysilicate microgels obtained have a $SiO_2$ content of from 0.1 to 10% by weight.

8. The process of claim 1, wherein the ion A is calcium or magnesium, the ion B is carbonate, sulfate or phosphate, and the salt AB is calcium carbonate, calcium sulfate, calcium phosphate, magnesium carbonate, magnesium sulfate or magnesium phosphate.

9. The process of claim 1, wherein the acid is sulfuric acid or phosphoric acid.

10. The process of claim 1, wherein the aqueous polysilicate microgels obtained have a pH within the range of from 5 to 11.

11. The process of claim 1, wherein the organic polymer is cationic starch or cationic polyacrylamide.

12. The process of claim 1, wherein the amount of $SiO_2$ in the aqueous silicate solution is greater than 10%.

13. A process for the production of paper from a suspension of cellulosic fibres, and optional filler, which comprises adding at least one drainage and retention aid to the suspension, said drainage and retention aid, said drainage and retention aid comprising at least one cationic or amphoteric organic polymer and aqueous polysilicate microgels having a specific surface area of at least 1000 m2/g obtained by bringing into contact an ion A with an ion B in the presence of an aqueous silicate solution, whereby the ions A and B represent ions of a precipitable salt AB, the salt AB being selected from metal salts of carbonates, sulfates and phosphates, sulfates and phosphates having a pKS value of at least 4, measured at 20° C. in water.

14. The process of claim 13, wherein the salt AB has a $pK_S$ value of at least 8, measured at 20° C. in water.

15. The process of claim 13, wherein the salt AB is precipitating in the aqueous phase.

16. The process of claim 13, wherein the aqueous silicate solution has a molar ratio of SiO2 to the salt AB higher than 1:1.

17. The process of claim 13, wherein the salt AB comprises particles in the colloidal range of particle size.

18. The process of claim 13, wherein the organic polymer is cationic starch or cationic polyacrylamide.

19. A process of improving drainage and retention in a paper-making process which comprises adding at least one drainage and retention aid to the suspension, said drainage and retention aid comprising at least one cationic or amphoteric organic polymer and aqueous polysilicate microgels obtained by bringing into contact (i) particles of a salt AB with an acid and an aqueous silicate solution, or (ii) an ion A with a protonic acid comprising an ion B in the presence of an aqueous silicate solution, or (iii) an ion A with an ion B and an acid in the presence of an aqueous silicate solution, whereby the ions A and B represent ions of a precipitable salt AB having a pKS value of at least 4, measured at 20° C. in water, and forming and draining the suspension on a wire.

20. The process of claim 19, wherein the salt AB is precipitating in the aqueous phase.

21. The process of claim 19, wherein the aqueous polysilicate microgels obtained have a specific surface area of at least 1000 $m^2/g$.

22. The process of claim 19, wherein the organic polymer is cationic starch or cationic polyacrylamide.

23. The process of claim 19, wherein the amount of $SiO_2$ in the aqueous silicate solution is greater than 10%.

* * * * *